Sept. 9, 1969   W. K. GULICK   3,465,787

SPRING-BIASED VALVE WITH ANTI-CHATTERING FEATURE

Filed April 12, 1967

INVENTOR.
WILLIAM K. GULICK
BY
ATTORNEY

United States Patent Office 3,465,787
Patented Sept. 9, 1969

3,465,787
SPRING-BIASED VALVE WITH ANTI-CHATTERING FEATURE
William K. Gulick, Cincinnati, Ohio, assignor to General Electric Company, a corporation of New York
Filed Apr. 12, 1967, Ser. No. 630,370
Int. Cl. F16k *1/14, 15/04*
U.S. Cl. 137—539.5          10 Claims

ABSTRACT OF THE DISCLOSURE

A spring-biased valve wherein chattering is minimized by having the spring biasing force on the closure member at an angle to the center line of the valve seat. When fluid acts on the closure member the angle of the spring biasing force causes the closure member to pivot when opening or closing. For relatively large valves a low mass closure may also be employed to help reduce chatter.

---

The invention described and claimed in the United States patent application herein resulted from work done under United States Government contract FA–SS–66–6. The United States Government has an irrevocable, non-exclusive license under said application to practice and have practiced the invention claimed herein, including the unlimited right to sublicense others to practice and have practiced the claimed invention for any purpose whatsoever.

Background of the invention

A great problem with spring-biased valves has been valve chatter, i.e., vibration of the valve closure member in its housing when fluid is flowing through the valve. Valve chatter may substantially shorten valve life by damaging the closure and/or seat, may result in unreliable output flow, and may severely limit the flow capacity of the valve by intermittently reducing the flow. Valve chatter is largely due to natural variations in flow forces acting on the closure member and the natural frequency of vibration of the spring-mass system.

Previous attempts to eliminate the chatter have included modifications such as adding a damper to the spring-mass system or providing a guide for the closure member so that the closure member must move through a given axial distance along a guided axis prior to the initiation of fluid flow. Both modifications have generally necessitated the use of close tolerance guided or sliding members. In high temperature, oil systems coking may take place on the sliding areas, or contamination may result from other sources which may eventually lead to greatly increased frictional forces acting on the closure member and its guiding structure and eventual jamming of the valve. A completely enclosed damper mechanism wherein the sliding surfaces are sealed from the oil is expensive to manufacture and install in the valve and does not provide a very effective antichattering effect. Also, in some cases it may be desirable to have a hysteresis effect (i.e., closing at a lower fluid pressure than opening pressure) for a normally closed valve.

Accordingly, it is an object of the present invention to greatly minimize, if not eliminate, chatter in spring-biased valves which may be used in a wide range of environmental systems.

Additionally, it is an object of the present invention to provide such a valve having increased flow capacity.

Further, it is an object of the present invention to provide such a valve with a controlled amount of hysteresis.

The above-stated objects can be realized by providing a spring-biased valve wherein the direction of the force applied by the spring to a closure member having a spherical portion is at an acute angle to the center line of the valve seat. By providing a force component on the closure member perpendicular to the center line of the seat, the closure member when moved by the fluid flowing through the valve will tend to pivot about an edge of the valve seat rather than lift itself entirely from the valve seat. For relatively large valves with high flow rates, it is additionally advantageous to provide a small mass closure member which allows the force component perpendicular to the center line of the seat to better maintain the closure member in contact with one edge of the seat as the closure member is moved to allow flow of the fluid through the valve and to minimize wear due to chatter. Also, by controlling the amount of pivotal travel and the direction of the biasing force a desired amount of hysteresis can be added to the system.

The subject matter which I regard as my invention is particularly pointed out and distinctly claimed in the concluding portion of my specification. My invention, however, together with further objects and advantages thereof, may best be understood by reference to the following description taken in connection with the accompanying drawings in which:

Figure 1:
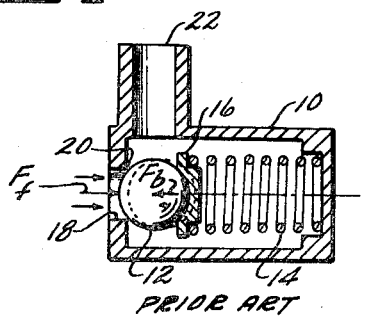
FIGURE 1 is a longitudinal section of a prior art, normally closed, spring-biased valve.

In FIGURE 1, a spring-biased, normally closed poppet valve is shown. This type of valve, well known in the prior art, is comprised of a housing 10, a spherical ball-type closure member 12, a spring 14, and a follower 16 located between an end of the spring 14 and the closure member 12. The valve has an outlet 22 and an inlet 18 with its associated passageway having at its interior end a valve seat 20. The valve housing 10, and particularly the portion thereof housing the spring 14, is structured so that the center line of the inlet passageway and the valve seat 20 coincides with the center line of the spring 14, and the diameter of the valve seat 20 is somewhat less than the diameter of the closure member 12.

In operation, fluid enters the valve through the inlet 18 and acts upon a portion of the closure surface. When the force $F_f$ due to the fluid pressure acting on the surface is greater than the spring biasing force $F_b$ holding the closure member 12 on the valve seat 20, the closure member 12 translates substantially rectilinearly off the valve seat, as shown by the dotted lines, thereby allowing fluid to flow through the valve. The displacement of the member 12, and hence the flow area opened thereby, is a function of the fluid pressure. When the fluid is flowing, the closure member is substantially freely floating, i.e., out of contact with any rigid structure, in the interior of the valve. Thus, the closure member 12 is susceptible to variations in the fluid flow and the natural frequency of the spring-mass (spring-follower and closure member) combination which may cause valve chatter, i.e., closure member vibration within the valve interior. This chatter can cause substantial wear of the valve seat and/or closure member which results in a substantially shortened valve life and may result in a relatively uneven flow of fluid from the valve.

In the figures there has been no attempt to show constructional details which would be well known to those skilled in the art, as for example, the fabrication of valve housings for assembly and replacement of components therein.

Figure 2:
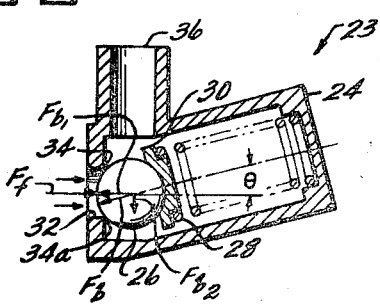
FIGURE 2 is a longitudinal section of one embodiment of a normally closed, spring biased valve embodying the subject invention.

In FIGURE 2 a spring-biased, normally closed valve 23 is shown which embodies the subject invention. The valve 23 is comprised of a valve housing 24, a spherical ball-type closure member 26, a biasing spring 28, and a follower 30 disposed between an end of the spring 28 and the closure member 26. The valve also has an outlet 36 and an inlet 32 with its associated passageway having a valve seat 34 at its interior end. The structure of the valve housing 24, and particularly the portion thereof housing the spring 28, is such that the center line of the spring 28 is disposed at an acute angle $\theta$ to the center line of the inlet passageway (which is also the center line of the valve seat 34). Due to the angular orientation of the spring with respect to the valve inlet, the biasing force $F_b$ acting on the closure member 26 has a component $F_{b1}$ acting along the center line of the valve seat tending to press the closure member 26 against the valve seat 34, and a component $F_{b2}$ perpendicular to the center line of the valve seat tending to push the closure member 26 toward the lower wall of the valve housing.

In operation, fluid enters the valve via the inlet 32 and the fluid pressure acts on the exposed surface of the closure member 26. When the force $F_f$ due to the fluid pressure becomes greater than the spring biasing force component $F_{b1}$ acting along the center line of the inlet port, the closure member 26 is moved so as to allow the fluid to flow. However, due to the force component $F_{b2}$ acting on the closure member 26 perpendicular to the center line, the closure member pivots about an edge 34a of the valve seat 34, as shown in FIGURES 2 and 3.

Figure 3:
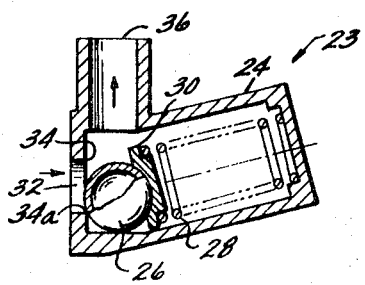
FIGURE 3 is a longitudinal section of the valve shown in FIGURE 2 with the valve open.

The valve 23, in a fully open position wherein the closure member 26 has pivoted about the seat edge 34a until it has contacted the interior of the housing, is shown in FIGURE 3. Because the closure member is held in contact with a portion of a valve body 24 while the closure member 26 is being moved from the valve seat 34, vibration (chattering) of the closure member is eliminated. When the closure member 26 is in its fully opened position, the biasing force maintains the closure member in a fixed lateral position against the stop or limit provided by the interior of the housing 24. Thus, a valve embodying the subject invention virtually eliminates chatter over an extremely wide range of flow rate including all normal flow ranges and hence has a flow capacity, without occurrence of chatter, much greater than that of similar size prior art valves.

Another feature of the subject invention is that a hysteresis effect may be built in. A hysteresis effect is basically one in which the fluid pressure at which a valve will close after it has been opened is less than the fluid pressure at which the valve initially opened. Thus, if a normally closed valve designed to open at 5 p.s.i.g. will not shut itself off until the fluid pressure is 4 p.s.i.g., the valve has hysteresis. Hysteresis in the subject embodiments is a function of the geometry or size of the valve seat and closure, the angle of the spring force on the closure member, and the extent of its lateral movement. During initial displacement of the closure member the spring 28 is compressed as the closure member is pivoted and displaced laterally. If the stop (housing interior) permits sufficient lateral movement, the closure member will pass "over the center" relative to the spring force thereon resulting in need to recompress the spring in order to pivot the closure member back to a closed position. Under these conditions a controlled hysteresis can be obtained. There is a limit to the amount of lateral movement above which the closure member will not pivot back to the seat no matter how great a reduction in fluid force $F_f$ there is. However, below this limit, the varying of the above-mentioned parameters will vary the amount of hysteresis, as desired.

There are certain applications in which a considerable amount of hysteresis would be desirable. One application would be where a valve were to be used to control coolant where the pressure of the fluid is proportional to the coolant rate demanded. In this case, a considerable amount of hysteresis would provide a safety factor allowing coolant to flow for a given pressure range below that demand pressure required to initiate coolant flow. Of even wider application would be the use of a small amount of hysteresis to prevent chatter when the fluid force is close to opening fluid force. In order for the hysteresis effect to take place it is generally necessary for the fluid force $F_f$ to somewhat exceed the fluid opening force of the valve so that the closure member will pivot beyond the given amount.

Figure 4:
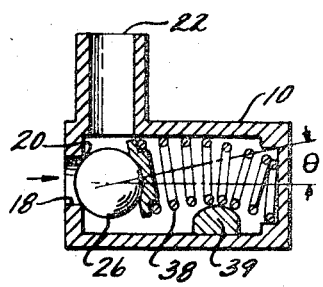
FIGURE 4 is a longitudinal section of a second embodiment of a normally closed, spring-biased valve embodying the subject invention.

In FIGURE 4 a second embodiment of the subject invention is shown wherein the housing 10 of a conventional poppet valve with the axis of the spring housing portion coincident with the valve seat axis may be used with a modified biasing spring 38 having a smaller diameter than the adjacent housing interior so as to provide a valve embodying the subject invention. The modified spring 38 is purposely buckled so that the center line of the portion of the spring that is acting on the closure member 26 is disposed at an acute angle $\theta$ to the center line of the valve seat 20. The buckled spring valve closure mechanism acts in a similar manner to that shown in FIGURES 2 and 3, i.e. causes the closure member 26 to pivot on the valve seat when moved, thereby preventing chatter.

As the outlet 22 is disposed adjacent the inlet 18, it is desirable to have the closure member 26 pivot on the valve seat in a direction away from the outlet 22 so that the member 26 does not tend to block the outlet 22 when fluid is flowing. To assure that the spring 38 will buckle in the proper lateral direction, a protrusion 39 is rigidly attached to the housing interior opposite the desired buckling direction. However, if the outlet is disposed a substantial distance away from the valve seat 20, no protrusion is necessary, as the closure member may pivot on any part of the valve seat without hindering flow through the valve outlet. Also, the buckling of the spring may be at a plurality of places, rather than just one, without affecting the operation of the valve.

It is not necessary that a follower be included within any of the valve structures shown in FIGURES 2, 3, and 4. In FIGURES 2, 3, and 4 the follower may be eliminated so that the end of the biasing spring will merely engage the surface of the closure member 26. However, the end of the spring should be finished so as to allow easy pivoting of the closure member without marring the surface thereof. Also, the closure member preferably should have a spherical portion which contacts the valve seat, but need not be completely spherical as long as there is low friction freedom of pivoting movement between the closure member and valve seat, housing, and follower or spring.

Figure 5:
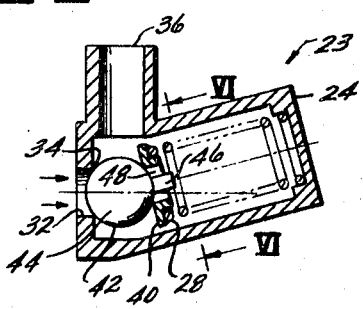
FIGURE 5 is a longitudinal section of the valve shown in FIGURES 2 and 3 with a modification for preventing spinning of the closure member.

In FIGURE 5 a valve is shown which is substantially similar to that shown in FIGURES 2 and 3, but additionally includes a modification to prevent spinning of the spherical closure member. The modified valve utilizes the same valve housing 24 with its inlet 32, and associated passageway valve seat 34, and outlet 36 and biasing spring 28, as that shown in FIGURES 2 and 3. However, a modified follower 40 is disposed between the spring 28 and a modified closure member 42. The closure member 42 consists of a substantially spherical portion 44 and a polygonal cross-section peg 46 attached thereto by means such as welding, soldering or screw. Although it is not to be limited to such a shape, the peg 46 is shown as having a rectangular cross-section.

Figure 6:
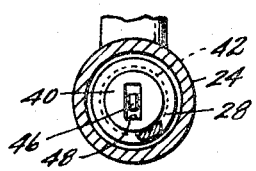
FIGURE 6 is a view of the valve shown in FIGURE 5 taken along the line denoted VI—VI.

The follower 40, which is best shown in FIGURE 6, is of a substantially similarly shape as the followers discussed in relation to the above-mentioned valve structures. The modification consists of providing an aperture 48 within the center of the follower 40. The aperture 48 is of a shape and dimensions such as to allow the closure peg 46 to pivot therein, as shown in FIGURE 5, but substantially prohibit rotation of the closure peg 46 (and hence closure member 42) about a longitudinal axis of the peg 46. Thus, for a peg 46 having a rectangular cross-section, the aperture 48 may be rectangular having a substantially greater length than that of the peg 46. This longer length of the aperture 48 allows low friction pivotal movement freedom for the closure member 42 relative to the follower 40 so as to permit the closure member 42 to freely pivot on the valve seat without scuffing. For proper aperture 48 alignment to permit closure member pivotal movement, the spring may be attached to the follower, such as by soldering, or the follower may have a dead-end groove therein larger than the spring thickness to permit abutment of the end of the spring on the follower so as to prevent relative rotation thereof.

It has been found that without such an anti-spinning modification, a spherical closure member may spin on its follower and on the valve seat especially when there is a high fluid flow rate through the valve. This spinning may be due to minor imperfections in the closure member surface and viscous friction acting on the closure member. Such spinning may cause wear of the closure member itself, the valve seat, and the portion of the follower that contacts the closure member and may also contribute somewhat to the instability of the closure member.

However, it should be understood that the subject invention without the anti-spinning modification does provide a valve closure mechanism which considerably reduces the wear and chattering of the valve over prior art valves. The anti-spinning feature further improves the already greatly reduced wear rate and anti-chattering effect under certain conditions.

Figure 7:
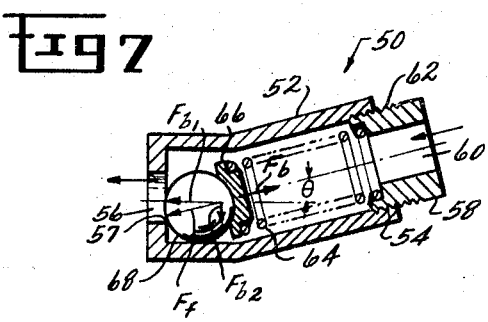
FIGURE 7 is a longitudinal section of a normally open, spring-biased valve embodying the subject invention.

In FIGURE 7 an embodiment of the subject invention as applied to a normally open spring biased valve is shown. The normally open valve 50 is comprised of a valve body 52 having a threaded opening 54 and an outlet 56 with its associated passageway which has a valve seat 57, a valve inlet 58 having an inlet passageway 60 therein and screw threads 62 so that the outlet member 58 can be threaded into the opening 54 of the valve cover, a tension biasing spring 64, a follower 66, and a substantially spherical closure member 68 adjacent the follower.

One end of the biasing spring 64 is fixed to the inlet member 58, and the other end of the spring 64 is attached to the follower 66. Thus, by screwing the inlet member 58 into or out of the valve housing 52, the end portion of the spring and hence the closure member 68, can be adjusted. The center line of the spring 64 is positioned so that it is at an acute angle $\theta$ to the center line of the valve outlet. The angle $\theta$ and the spring force is preferably adjusted so that the closure member 68 is wedged in a recess in the interior wall of the valve housing 52 adjacent the valve seat with no spring force acting on the closure member 68 when no fluid is flowing through the valve.

When fluid flows through the inlet passageway 60 into the interior of the valve, the fluid pressure will act upon the follower 66 so as to produce a force $F_f$ acting on the closure member along the center line of the spring. This force has two components—one $F_{b1}$, acting along the center line of the outlet 56 and one, $R_{b2}$, acting perpendicularly to the outlet center line tending to maintain the closure member 68 against the interior wall within the recess. Thus, when the force $F_f$ acting on the follower 56 due to the fluid pressure exceeds the force necessary to pivot the closure member, the closure member 68 will tend to pivot upon the valve seat 57 against the spring tension $F_b$ until the fluid pressure force is sufficient to cause the closure member 68 to fully close the outlet opening 56. Thus, due to the angular positioning of the tension biasing spring 64, the closure member will be substantially maintained in pivotal contact with the valve seat 57 so as to help reduce chattering, in a similar manner as that described in connection with the normally closed valves as shown in FIGURES 2 and 3.

Of course, it is obvious that the anti-spinning modification, as shown in FIGURE 5, could also be applied to the valve embodiments shown in FIGURES 4 and 7.

The angle $\theta$ at which the biasing force acts is dependent on many factors such as the maximum desired fluid flow rate, the density of the fluid, the mass of the closure member, the desired opening or closing force of the valve, etc. The valve biasing force $F_{b1}$ for opening (or closing) the valve equals $F_b \cos \theta$, where $F_b$ is the force of the spring acting along its center line. The pivotal biasing force $F_{b2}$ acting perpendicular to the valve seat center line equals $F_b \sin \theta$. Therefore, once the minimum pivotal biasing force $F_{b2 \ min}$ is found for a given set of valve specifications, the spring rate of the spring and the angle $\theta$ can be set so that $F_b \sin \theta$ is always greater than or equal to $F_{b2 \ min}$, and $F_b \cos \theta$ is of the desired valve biasing force for opening (or closing) the valve.

Another factor which contributes to valve chatter is the mass of the closure member. The mass is a factor in the inertial forces which act on the closure member due to changes in fluid pressure acting on the ball. Especially in cases where there are high valve flow rates and/or there are frequent abrupt changes in flow rate of the fluid, the inertial force acting on the closure member may cause the closure member, even when there is a substantial force acting on the closure member perpendicular to the center line of the valve seat, to be completely lifted off the valve seat (overshoot) and hence be in a position of instability where valve chatter is likely to occur. By reducing the mass of the closure member, the tendency to so overshoot will be reduced. A second advantage in reducing the mass of the closure member is that when any amount of chattering occurs, the less the closure member mass, the less the impact and hence, the less the wear will be to the valve seat. Since ball type valves may chatter to some degree at very low fluid flow through the valve, reducing the mass of the ball type closure member may increase valve life.

Of course, there are many ways of reducing the mass while maintaining the shape of the closure member. The closure member may be made of relatively low density materials such as plastics, or the closure member may be hollow, such as a hollow metal sphere, as shown by the closure member 26 in FIGURES 2, 3, and 4. Hollow stainless steel spheres of very low mass are available and very useful when the valve is to be operated at high temperatures and/or is to be used for corrosive fluids.

Figure 8A:
FIGURE 8a is a simplified view illustrating the flow area through the valve seat of the prior art valve shown in FIGURE 1 when the valve is open.
Figure 8B:
FIGURE 8b is a simplified view illustrating the flow area through the valve seat of the valve shown in FIGURE 3 when the valve is open.

Another feature of the invention is that due to the lateral movement of the closure member as it pivots about a point on the valve seat, for a given axial displacement, greater flow through the valve is provided as compared to conventional poppet valves of the same size and rating. This is illustrated by the flow area 70 (unshaded) of a conventional poppet valve, as represented in a simplified form by FIGURE 8a, which is considerably less than the flow area 72 (unshaded) of a valve embodying the subject invention, as represented in a simplified form by FIGURE 8b.

Also, it is unnecessary to use a valve seat with a substantially sharp edge. If desirable, the valve seats may have a curved surface to conform with the shape of the closure member. In such a case, the closure member will tend to pivot about the edge of the curved portion of the valve seat, in a similar manner to that discussed above.

It is fully intended that many modifications may be made to the disclosed valve mechanism which do not depart from the scope of the subject invention.

What I claim as new and desire to secure by Letters Patent of the United States is:

1. A valve comprising,
   a housing including a fluid inlet, a fluid outlet, and a fluid passageway with a valve seat and having a passageway center line,
   a closure member having a substantially spherical portion for engaging said valve seat to control fluid flow through the valve and pivotal on said seat,
   spring means for providing a first biasing force on said closure member acting in a direction coincident with the passageway center line and a second biasing force on said closure member acting in a direction perpendicular to the passageway center line to assure pivoting of said closure member on said seat, and
   means for limiting pivotal movement of said closure member.

2. A valve as in claim 1 wherein,
   said housing includes a substantially cylindrical spring housing portion disposed at an acute angle to the passageway center line, and
   said spring means is a coil spring disposed within said spring housing portion longitudinally thereof.

3. A valve as in claim 1 wherein,
   said housing includes a substantially cylindrical spring housing portion coaxially disposed about an extension of the passageway center line, and
   said spring means is a buckled coil spring disposed within said spring housing portion, and the portion of said coil spring adjacent said closure member is at an acute angle to the passageway center line.

4. A valve as in claim 1 also including anti-spinning means for preventing spinning of said closure member when fluid is flowing through said valve, and wherein said spring means normally biases said valve closed.

5. A valve as in claim 4 wherein,
   said anti-spinning means is a substantially disc-shaped follower disposed between an end of said coil spring and said closure member having a rectangular aperture therethrough, and
   said closure member includes means for engaging said anti-spinning means which is radially extending from and rigidly attached to said closure member and has cross-sectional dimensions such that said closure member is prevented from rotating in the aperture of said anti-spinning means, but is free to pivot therein.

6. A valve as in claim 1 wherein said closure member is a substantially spherical ball of small mass having a diameter substantially larger than that of said valve seat and said spring means normally biases said valve closed.

7. A valve as in claim 6 wherein said closure member having a small mass is a hollow spherical ball.

8. A valve as in claim 5 wherein said closure member is a substantially spherical ball of small mass having a diameter substantially larger than the diameter of said valve seat.

9. A valve comprising,
   a housing including a fluid inlet, a fluid outlet, and a fluid passageway with a circular valve seat having a passageway center line,
   a closure member having a substantially spherical portion for engaging said valve seat and pivotal relative thereto to control fluid flow through said valve,
   tension spring means positioned at an acute angle to the passageway center line and attached at one end to said housing for biasing said closure member away from full engagement with said valve seat, and
   a follower disposed between said spring means and said closure member and attached to said spring means at the other end thereof, wherein said housing includes means for limiting pivotal movement of said closure member.

10. A valve as in claim 1 wherein said spring means normally biases said valve closed, and said means for restricting pivotal movement is positioned so that said closure member moves "over center" relative to the first biasing force and closes fluid flow at a lower fluid pressure than that required to initially open fluid flow through said valve.

References Cited

UNITED STATES PATENTS

| | | | |
|---|---|---|---|
| 1,104,201 | 7/1914 | Lenzi | 137—539.5 X |
| 1,447,102 | 2/1923 | Rae | 137—521 X |
| 1,700,234 | 1/1929 | McCrosky | 137—533.11 |
| 1,991,227 | 2/1935 | Proctor et al. | 137—539.5 X |
| 2,564,815 | 8/1951 | Raymond | 137—539.5 |
| 2,714,392 | 8/1955 | Mercier | 137—539.5 X |
| 2,914,085 | 11/1959 | Mercier | 137—514 |
| 2,949,931 | 8/1960 | Ruppright | 137—528 |
| 3,105,516 | 10/1963 | Werra et al. | 137—533.11 |
| 3,263,699 | 8/1966 | Givler et al. | 137—517 X |
| 2,903,009 | 9/1959 | Tacchi | 137—521 X |

FOREIGN PATENTS

| | | |
|---|---|---|
| 11,268 | 5/1914 | Great Britain. |
| 75,004 | 1/1931 | Norway. |
| 734,965 | 8/1955 | Great Britain. |
| 1,183,373 | 1/1959 | France. |

WILLIAM F. O'DEA, Primary Examiner

DENNIS H. LAMBERT, Assistant Examiner

U.S. Cl. X.R.

137—527; 251—333